United States Patent
Hubschmid et al.

(10) Patent No.: US 8,536,273 B2
(45) Date of Patent: Sep. 17, 2013

(54) TOUGHENED COMPOSITION

(75) Inventors: Chantal Hubschmid, The Woodlands, TX (US); Celine Meunier, Kemps Loechle (FR); Ulrich Weidmann, Basel (CH)

(73) Assignee: Huntsman International LLC, The Woodlands, TX (US)

( * ) Notice: Subject to any disclaimer, the term of this patent is extended or adjusted under 35 U.S.C. 154(b) by 719 days.

(21) Appl. No.: 11/995,752

(22) PCT Filed: Jul. 14, 2006

(86) PCT No.: PCT/EP2006/064283
§ 371 (c)(1),
(2), (4) Date: Jan. 15, 2008

(87) PCT Pub. No.: WO2007/009957
PCT Pub. Date: Jan. 25, 2007

(65) Prior Publication Data
US 2008/0200589 A1 Aug. 21, 2008

(30) Foreign Application Priority Data
Jul. 15, 2005 (EP) .................................... 05106516

(51) Int. Cl.
*C08G 59/50* (2006.01)
*C08L 53/00* (2006.01)
*C08L 63/00* (2006.01)
*B32B 27/38* (2006.01)

(52) U.S. Cl.
USPC ......................... 525/113; 523/400; 525/122

(58) Field of Classification Search
USPC ................. 523/400; 525/523, 529, 530, 533, 525/107, 108, 113, 122
See application file for complete search history.

(56) References Cited

U.S. PATENT DOCUMENTS

| 5,908,877 | A | 6/1999 | Ci et al. |
| 6,894,113 | B2 | 5/2005 | Court et al. |
| 2003/0187154 | A1 | 10/2003 | Schoenfeld et al. |
| 2004/0034124 | A1* | 2/2004 | Court et al. ................... 523/400 |

FOREIGN PATENT DOCUMENTS

| EP | 0659833 | | 6/1995 |
| EP | 1290088 B1 | * | 1/2005 |
| WO | WO 2006077153 A2 | * | 7/2006 |

OTHER PUBLICATIONS

Technical Data Sheet for EPI-REZ 3510-W-60, provided by Hexion (no date).*
Product Overview for Jeffamine Polyetheramines, provided by Huntsman (no date).*
Machine translation of EP 0659833 A1, provided by the EPO website (no date).*
Gam, K.T., et al, "Preparation and Mechanical Properties of Epoxy-Clay Nanocomposites. Influence of Core-Shell Rubber Particles Addition to Epoxy-Clay Nanocomposites," Annual Technical Conference—Society of Plastics Engineers, vol. 2, No. 59, 2003, pp. 2176-2179.

* cited by examiner

Primary Examiner — Michael J Feely

(57) ABSTRACT

The instant invention relates to epoxy resin compositions comprising an epoxy resin, a block copolymer having at least one block predominantly composed of methyl methacrylate units or a core shell component and a hardener of the polyoxyalkyleneamine type. The epoxy materials cured from these compositions have high impact resistance.

8 Claims, No Drawings

TOUGHENED COMPOSITION

CROSS REFERENCE TO RELATED APPLICATIONS

This application is the National Phase of International Application PCT/EP2006/064283 filed Jul. 14, 2006 which designated the U.S. and which claims priority to European Patent Application (EP) 05106516.7 filed Jul. 15, 2005. The noted applications are incorporated herein by reference.

TECHNICAL FIELD

This invention relates to epoxy resin compositions with improved toughness resistance. Epoxy resin compositions exhibit-numerous advantageous properties which allow them to be used as structural adhesives or as a matrix for composite materials or in applications for protecting electronic components. The compositions of the invention comprise an epoxy resin, an impact modifier component, especially a copolymer, and a hardener. These compositions can be manufactured by dissolution of the copolymer in the epoxy resin, followed by addition of the hardener and crosslinking under hot conditions.

BACKGROUND OF THE INVENTION

Epoxy materials have a high crosslinking density, which provides them with a high glass transition temperature Tg, which confers excellent thermomechanical properties on the material. The higher the crosslinking density, the higher the Tg of the material and consequently the better the thermomechanical properties: the higher the operating temperature limit of the material. Nevertheless, the impact strength properties of epoxy materials are insufficient for numerous applications. Numerous solutions have been developed to attempt to respond to this problem. At the same time, while all epoxy materials are difficult to strengthen with regard to impacts, epoxy materials with high Tg values are the most difficult.

US patent application 2003/0187138 describes a toughener for thermosetting resins which comprised a trithiocarbonate polymer.

The patent EP 0 659 833 describes a composition based on epoxy resins, impact modifier and a mixture of amine hardeners being formed of dicyandiamide, cycloaliphatic amine and polyoxyalkylenamine.

U.S. Pat. No. 486,256 describes a two-part composition comprising an epoxy resin, a chain extender, a base catalyst and a polymeric toughener, especially a core-shell graft copolymer. US Publication US 2003/0187154 describes impact-resistant epoxy resin compositions containing an epoxy resin (A), a copolymer (B), for example a CTBN rubber, a latent hardener (C) and reaction products containing more than one carboxyl group per molecule.

Recently, it has been found that the addition of triblock copolymers having at least one block predominantly composed of methyl methacrylate units to epoxy compositions results in epoxy materials with improved impact resistance; EP1290088.

The patent application WO 03/063572 describes thermoset materials with improved impact strength, obtained from compositions comprising a hardenable resin, typically epoxy resin, polyamide resulting from the condensation of at least one diacid and at least one diamine, and possibly an impact modifier selected from SBM, BM and MBM copolymers.

SUMMARY OF THE INVENTION

It now has surprisingly been found that the impact resistance of epoxy materials is significantly improved when compositions containing an epoxy resin, an impact modifier component especially a core-shell copolymer or a block copolymer having at least one block predominantly composed of methyl methacrylate units, together with a polyoxyalkyleneamine hardener, are cured to form epoxy materials.

DETAILED DESCRIPTION OF THE INVENTION

The present invention thus relates to epoxy resin compositions comprising (a) an epoxy resin liquid at room temperature having on average more than one 1,2-epoxide group in the molecule;

(b) a hardener-accelerator system consisting essentially of a polyoxyalkyleneamine hardener (commercialized by Huntsman as Jeffamine® hardener);

(c) an impact modifier containing at least one of (C1) a block copolymer having at least one block predominantly composed of methyl methacrylate or a core-shell copolymer (C2).

Epoxy Resin

The term "epoxy resin" is understood to mean any organic compound having at least two functional groups of oxirane type which can be polymerized by ring opening. The term "epoxy resin" denotes any conventional epoxy resin which is liquid at room temperature (23° C.) or at a higher temperature. These epoxy resins can be monomeric or polymeric, on the one hand, aliphatic, cycloaliphatic, heterocyclic or aromatic, on the other hand. Mention may be made, as examples of such epoxy resins, of resorcinol diglycidyl ether, bisphenol A diglycidyl ether, triglycidyl-p-amino-phenol, bromobisphenol F diglycidyl ether, the triglycidyl ether of m-amino-phenol, tetraglycidylmethylenedianiline, the triglycidyl ether of (trihydroxy-phenyl)methane, polyglycidyl ethers of phenol-formaldehyde novolak, polyglycidyl ethers of ortho-cresol novolak and tetraglycidyl ethers of tetraphenyl-ethane. Mixtures of at least two of these resins can also be used.

Epoxy resins are, for example, those which contain groups of the formula A

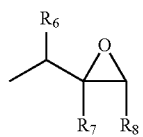

in which either $R^6$ and $R^8$ are each a hydrogen atom, in which case $R^7$ is then a hydrogen atom or a methyl group, or $R^6$ and $R^8$ together are —$CH_2$—$CH_2$— or —$CH_2$—$CH_2$—$CH_2$—, in which case $R^7$ is then a hydrogen atom, bonded directly to oxygen, nitrogen or sulfur atoms.

Examples, which may be mentioned, of such resins are polyglycidyl esters and poly-(.beta.-methylglycidyl)esters, which can be obtained by reaction of a compound containing two or more carboxylic acid groups per-molecule with epichlorohydrin, glycerol dichlorohydrin or .beta.-methylepichlorohydrin in the presence of an alkali. Such polyglycidyl esters can be derived from aliphatic polycarboxylic acids, for example oxalic acid, succinic acid, glutaric acid, adipic acid, pimelic acid, suberic acid, azelaic acid, sebacic acid or dimerized or trimerized linoleic acid, from cycloaliphatic polycarboxylic acids, such as tetrahydrophthalic acid, 4-methyltetrahydrophthalic acid, hexahydrophthalic acid and 4-methylhexahydrophthalic acid, and from aromatic polycarboxylic acids, such as phthalic acid, isophthalic acid and terephthalic acid.

Other examples are polyglycidyl ethers and poly-(.beta.-methylglycidyl)ethers which are obtainable by reaction of a compound containing at least two free alcoholic and/or phenolic hydroxyl groups per molecule with the corresponding epichlorohydrin under alkaline conditions, or in the presence of an acid catalyst, with subsequent treatment with an alkali.

These ethers can be prepared with poly-(epichlorohydrin) from acyclic alcohols, such as ethylene glycol, diethylene glycol and higher poly-(oxyethylene)glycols, propane-1,2-diol and poly-(oxypropylene)glycols, propane-1,3-diol, butane-1,4-diol, poly-(oxytetramethylene)glycols, pentane-1,5-diol, hexane-1,6-diol, hexane-2,4,6-triol, glycerol, 1,1,1-trimethylolpropane, pentaerythritol and sorbitol, from cycloaliphatic alcohols, such as resorcitol, quinitol, bis-(4-hydroxycyclohexyl)-methane, 2,2-bis-(4-hydroxycyclohexyl)-propane and 1,1-bis-(hydroxymethyl)-cyclohex-3-ene, and from alcohols having aromatic nuclei, such as N,N-bis-(2-hydroxyethyl)-aniline and p,p'-bis-(2-hydroxyethylamino)-diphenylmethane. They can furthermore be prepared from mononuclear phenols, such as resorcinol and hydroquinone, as well as polynuclear phenols, such as bis-(4-hydroxyphenyl)-methane, 4,4-dihydroxy-diphenyl, bis-(4-hydroxyphenyl)sulfone, 1,1,2,2-tetrakis-(4-hydroxyphenyl)-ethane, 2,2-bis-(4-hydroxyphenyl)-propane (otherwise known as bisphenol A) and 2,2-bis-(3,5-dibromo-4-hydroxyphenyl)-propane, as well as novolaks formed from aldehydes, such as formaldehyde, acetaldehyde, chloral and furfurol, with phenols, such as phenol itself and phenol which is substituted on the ring by chlorine atoms or alkyl groups having in each case up to nine carbon atoms, such as 4-chlorophenol, 2-methylphenol and 4-tert-butylphenol.

Poly-(N-glycidyl) compounds include, for example, triglycidyl isocyanurate and N,N'-diglycidyl-derivatives of cyclic alkyleneureas, such as ethyleneurea and 1,3-propyleneurea, and hydantoins, such as 5,5-dimethylhydantoin.

Poly-(S-glycidyl) compounds are, for example, the di-S-glycidyl derivatives of dithiols, such as ethane-1,2-dithiol and bis-(4-mercaptomethylphenyl)ether.

Examples of epoxy resins containing groups of the formula A in which $R^6$ and $R^8$ together are a —$CH_2$—$CH_2$— group are bis-(2,3-epoxycyclopentyl)ether, 2,3-epoxycyclopentyl glycidyl ether, 1,2-bis-(2,3-epoxycyclopentyloxy)-ethane and 3,4-epoxycyclohexylmethyl 2',4'-epoxycyclohexanecarboxylate which are less preferred.

Epoxy resins in which the 1,2-epoxide groups are bonded to different types of hetero atoms, for example the N,N,O-triglycidyl derivative of 4-aminophenol, the glycidyl ether/glycidyl ester of salicyclic acid or p-hydroxybenzoic acid, N-glycidyl-N'-(2-glycidyloxypropyl)-5,5-dimethylhydantoin and 2-glycidyloxy-1,3-bis-(5,5-dimethyl-1-glycidyl-3-hydantoinyl)-propane, are also suitable.

Aromatic epoxy resins, such as diglycidyl ethers of bisphenols, are specifically preferred.

The epoxy resin (a) is advantageously employed in the compositions according to the invention in amounts of 30 to 94.5% by weight, preferably 45 to 84% by weight and in particular 60% to 78.5% by weight, based on the amount of components (a), (b) and (c).

Polyoxyalkylene Amine

U.S. Pat. No. 4,528,308 describes an epoxy resin curing agent comprising a mixture of an imidazole compound and a selected polyoxyalkylenepolyamine.

As regards the polyoxyalkyleneamine (Jeffamine®) type hardener, such hardeners are usually based on a polyether backbone composed of polypropylene oxide, polyethylene oxide or a mixture thereof whereby the terminal hydroxyl group(s) is/are converted to an amine. Preferably, the amine functionality of the polyoxyalkyleneamines hardener is at least 2 so as to form a diamine, triamine. Said polyoxyalkyleneamines are commercially available and include polyoxypropylenetriamine (preferably having an average molecular weight of approximately 440) and polyoxypropylenediamine (α-(2-aminomethylethyl)-ω-(2-aminomethylethoxy)-poly-[oxy(methyl-1,2-ethanediyl)], preferably having an average molecular weight of approximately 230). Further suitable hardeners may be found in Technical Bulletin of Huntsman: "The Jeffamine Polyoxyalkylenamines"; Huntsman Corporation 2002 (1008-1002).

In addition to the Jeffamine® type hardener, further hardeners may be included in the epoxy composition. Preferably, such further hardeners are amine hardeners. For example, they can be isophorondiamin, dicyandiamid, chlortolurone and laromine, N-ammethylpiperazine, 5-amino-1,3,3-trimethyl cyclohexane-methanamine, ethyleneamine, 2,2-dimethyl-4,4-methylenebis-(cyclohexyl-amin) and adducts, as they are obtainable for example by the reaction of 5-amino-1,3,3-trimethyl cyclohexane-methanamine with epoxy resins, It is believed that the beneficial effect of the presence of the Jeffamine on the properties of the cured resin is especially apparent when the Jeffamine is the most important hardener of the hardener mixture. Therefore, if the polyoxyalkyleneamine (Jeffamine®) type hardener is not the sole hardener, it forms preferably at least 50%, more preferably at least 65, 66, 67, 68, 69, 70%, 75% or 80% y weight, based on the amount of hardeners. The non-Jeffamine hardener can be a cycloaliphatic amine like those cited above, or an aromatic amine hardener, like diaminodiphenylsulfon. Preferably the hardener mixture amine does not comprise dicyandiamid.

The polyoxyalkyleneamine (Jeffamine®) type hardener (b) is advantageously employed in the compositions according to the invention in amounts of 5% to 70% by weight, preferably 5% to 60% by weight and in particular 5% to 50% by weight, based on the amount of components (a), (b) and (c).

Impact Modifier

As regards the preferred impact modifier (c1), it consists essentially of a block copolymer having at least one block predominantly composed of methyl methacrylate, a new family of self-assembling block co-polymers which are constituted of three blocks of linear chains covalently bonded to one another is preferably used. Said family comprises S-B-M- and the M-B-M-triblock copolymers. S-B-M-triblocks are, in particular, constituted of polystyrene (PS), 1,4-polybutadiene (PB) and poly(methylmethacrylate) (PMMA), being preferably syndiotactic, whereas M-B-M-triblocks are pure acrylic symmetric block copolymers constituted of a center block of poly(butylacrylate) (PBA) and two side blocks of poly(methylmethacrylate) (PMMA).

As regards the S-B-M triblock, M is composed of methyl methacrylate monomers or comprises at least 50% by mass of methyl methacrylate, preferably at least 75% by mass of methyl methacrylate. The other monomers constituting the M block can be acrylic or nonacrylic monomers and may or may not be reactive. The term "reactive monomer" is understood to mean: a chemical group capable of reacting with the oxirane functional groups of the epoxy molecules or with the chemical groups of the hardeners. Mention may be made, as non-limiting examples of reactive functional groups, of: oxirane functional groups, amine functional groups or carboxyl functional groups. The reactive monomer can be (meth) acrylic acid or any other hydrolysable monomer resulting in these acids. Mention may be made, among the other monomers which can constitute the M block, as non-limiting examples, of glycidyl methacrylate or tert-butyl methacrylate. M is advantageously composed of syndiotactic PMMA to at least 60%. The M block of the S-B-M triblock can be identical or different.

The Tg of B is advantageously less than 0° C. and preferably less than −40° C.

The monomer used to synthesize the elastomeric B block can be a diene chosen from butadiene, isoprene, 2,3-dimethyl-1,3-butadiene, 1,3-pentadiene or 2-phenyl-1,3-butadiene. B is advantageously chosen from poly(dienes), in particular poly(butadiene), poly(isoprene) and their random copolymers, or from partially or completely hydrogenated poly(dienes). Use is advantageously made, among polybutadienes, of those with the lowest Tg, for example 1,4-polybutadiene with a Tg (approximately −90° C.) lower than that of 1,2-polybutadiene (approximately 0° C.). The B blocks can also be hydrogenated. This hydrogenation is carried out according to the usual techniques.

The monomer used to synthesize the elastomeric B block can also be an alkyl (meth)acrylate. The following Tg values (between brackets following the name of the acrylate) are obtained: ethyl acrylate (−24° C.), butyl acrylate (−54° C.), 2-ethylhexyl acrylate (−85° C.), hydroxyethyl acrylate (−15° C.) and 2-ethylhexyl methacrylate (−10° C.). Butyl acrylate is advantageously used. The acrylates are different from those in the M block in order to observe the condition that B and M are incompatible.

The B blocks are preferably predominantly composed of 1,4-polybutadiene.

The B blocks of the S-B-M triblock can be identical or different.

The Tg of S is advantageously greater than 23° C. and preferably greater than 50° C. Mention may be made, as examples of S blocks, of those which derive from vinylaromatic compounds, such as styrene, α-methylstyrene or vinyltoluene, and those which derive from alkyl esters of acrylic acid and/or methacrylic acid having from 1 to 18 carbon atoms in the alkyl chain. In the latter case, the acrylates are different from those of the M block, in order to observe the condition that S and M are incompatible.

The S-B-M triblock has a number-average molar mass which can be between 10,000 g/mol and 500,000 g/mol, preferably between 20,000 and 200,000 g/mol. The S-B-M triblock advantageously has the following composition, expressed as fraction by mass, the total being 100%:

M: between 10 and 80% and preferably between 10 and 70%,

B: between 2 and 80% and preferably between 5 and 70%,

S: between 10 and 88% and preferably between 15 and 85%.

Nanostrength® E20 and Nanostrength® E 40 products are representative of triblockcopolymers of the S-B-M type obtainable from the company Arkema, France.

As regards the M-B-M triblock, M is composed of methyl methacrylate monomers or comprises at least 50% by mass of methyl methacrylate, preferably at least 75% by mass of methyl methacrylate. The other monomers constituting the M block can be acrylic or non-acrylic monomers and may or may not be reactive. The term "reactive monomer" is understood to mean: a chemical group capable of reacting with the oxirane functional groups of the epoxy molecules or with the chemical groups of the hardeners. Mention may be made, as non-limiting examples of reactive functional groups, of: oxirane functional groups, amine functional groups or carboxyl functional groups. The reactive monomer can be (meth) acrylic acid or any other hydrolysable monomer resulting in these acids. Mention may be made among the other monomers which can constitute the M-block, as non-limiting examples, of glycidyl methacrylate or tert.-butyl methacrylate. M is advantageously composed of syndiotactic PMMA to at least 60%. The two M-blocks of the M-B-M triblock can be identical or different. They can also be different in their molar mass but composed of the same monomers.

The Tg of B is advantageously less than 0° C. and preferably less than −40° C.

The monomer used to synthesize the elastomeric B block can be a diene chosen form butadiene, isoprene, 2,3-dimethyl-1,3-butadiene, 1,3-pentadiene or 2-phenyl-1,3-butadiene. B is advantageously chosen form poly(dienes), in particular poly(butadiene), poly(isoprene) and their random copolymers, or from partially or completely hydrogenated poly(dienes). Use is advantageously made, among polybutadiene, of those with the lowest Tg, for example 1,4-polybutadiene with a Tg (approximately −90°) lower than that of 1,2-polybutadiene (approximately 0°). The B blocks can also be hydrogenated. The hydrogenation is carried out according to the usual techniques.

The monomer used to synthesize the elastomeric B block can also be an alkyl(meth)acrylate. The following Tg values (between brackets following the name of the acrylate) are obtained: ethyl acrylate (−24° C.), butyl acrylate (−54° C.), 2-ethylhexylacrylate (−85° C.), hydroxyethylacrylate (−15° C.) and 2-ethylhexyl methacrylate (−10° C.). Butyl acrylate is advantageously used. The acrylates are different form those in the M block in order to observe the condition that B a and M are incompatible.

The B blocks are preferably predominantly compose of 1,4-polybutadiene.

The M-B-M-triblock has a number-average molar mass which can be between 10000 g/mol and 500000 g/mol, preferably between 20000 and 200000 g/mol. The M-B-M-triblock advantageously has the following compositions with regard to M and B, expressed as fraction by mass, the total being 100%. M between 10 and 80% and preferably between 15% and 70%. B between 90% and 20% and preferably between 85% and 30%

There exists also M-A-M triblock copolymers which are made of 2 side blocks of PMMA surrounding a center block of polybutyl acrylate.

The designation Nanostrength M 22 represents a triblock copolymer of the M-A-M type obtainable from Arkema, France.

The block copolymers used in the materials of the present invention can be manufactured by anionic polymerization, for example according to the processes disclosed in Patent Applications EP 524,054 and EP 749,987.

According to a preferred form of the invention, the impact modifier comprises at least one S-B-M- or M-B-M-block copolymer and at least one polymer chosen from core-shells (A), functionalized elastomers, S-B block copolymers and ATBN (Amine Terminated Butadiene Acrylonitrile Copolymer) and CTBN (Carboxyl Terminated Butadiene Acrylonitrile) reactive rubbers.

As regards the S-B diblock, the S and B blocks are incompatible and they are composed of the same monomers and optionally comonomers as the S blocks and the B blocks of the S-B-M triblock. The S and B blocks can be identical to or different from the other S and B blocks present in the other block copolymers of the impact modifier in the thermoset material.

The S-B diblock has a number-average molar mass which can be between 10,000 g/mol and 500,000 g/mol, preferably between 20,000 and 200,000 g/mol. The S-B diblock is advantageously composed of a fraction by mass of B of between 5 and 95% and preferably between 15 and 85%.

As regards the core-shell copolymer (A), it is provided in the form of fine particles having an elastomer core and at least one thermoplastic shell, the size of the particles generally being less than 1 μm and advantageously between 50 and 500 nm. Mention may be made, as examples of cores, of homopolymers of isoprene or of butadiene, copolymers of isoprene with at most 30 mol % of a vinyl monomer and copolymers of butadiene with at most 30 mol % of a vinyl monomer. The vinyl monomer can be styrene, an alkylstyrene, acrylonitrile or an alkyl (meth)acrylate. Another core family is composed of homopolymers of an alkyl (meth) acrylate and copolymers of an alkyl (meth)acrylate with at most 30 mol % of a vinyl monomer. The alkyl (meth)acrylate is advantageously butyl acrylate. The vinyl monomer can be styrene, an alkylstyrene, acrylonitrile, butadiene or isoprene. The core of the copolymer (A) can be crosslinked in all or part. It is sufficient to add at least difunctional monomers during the preparation of the core. These monomers can be chosen from poly(meth)acrylic esters of polyols, such as butylene di(meth)acrylate and trimethylolpropane trimethacrylate. Other difunctional monomers are, for example, divinylbenzene, trivinylbenzene, vinyl acrylate and vinyl methacrylate. It is also possible to crosslink the core by introducing therein, by grafting or as comonomer during the polymerization, unsaturated functional monomers, such as unsaturated carboxylic acid anhydrides, unsaturated carboxylic acids and unsaturated epoxides. Mention may be made, as examples, of maleic anhydride, (meth)acrylic acid and glycidyl methacrylate.

The shell or shells are homopolymers of styrene, of an alkylstyrene or of methyl methacrylate or copolymers comprising at least 70 mol % of one of these above monomers and at least one comonomer chosen from the other above monomers, vinyl acetate and acrylonitrile. The shell can be functionalized by introducing therein, by grafting or as comonomer during the polymerization, unsaturated functional monomers, such as unsaturated carboxylic acid anhydrides, unsaturated carboxylic acids and unsaturated epoxides. Mention may be made, as examples, of maleic anhydride, (meth) acrylic acid and glycidyl methacrylate. Mention may be made, as examples, of core-shell copolymers (A) having a polystyrene shell and core-shell copolymers (A) having a PMMA shell. There also exist core-shell copolymers (A) having two shells, one made of polystyrene and the other, on the outside, made of PMMA. Examples of copolymer (A) and their process of preparation are disclosed in the following patents: U.S. Pat. No. 4,180,494, U.S. Pat. No. 3,808,180, U.S. Pat. No. 4,096,202, U.S. Pat. No. 4,260,693, U.S. Pat. No. 3,287,443, U.S. Pat. No. 3,657,391, U.S. Pat. No. 4,299, 928 and U.S. Pat. No. 3,985,704.

The core advantageously represents, by weight, 70 to 90% of (A) and the shell 30 to 10%.

Mention may be made, as example of copolymer (A), of that composed (i) of 75 to 80 parts of a core comprising, in moles, at least 93% of butadiene, 5% of styrene and 0.5 to 1% of divinylbenzene and (ii) of 25 to 20 parts of two shells essentially of the same weight, the internal one made of polystyrene and the other, external, made of PMMA.

While block copolymers like SBM when introduced into epoxy resin permit to form transparent or colored cured resin products, incorporation of core shell polymers tends to lead to opaque cured resin products. Therefore, for some applications and uses of the cured product, incorporation of core shell polymers into a resin composition is not always desired.

According to a second preferred form of the invention, the impact modifier comprises at least one S-B-M block copolymer and at least one S-B block copolymer. The impact modifier advantageously, comprises between 5 and 80% of S-B diblock for respectively from 95 to 20% of S-B-M triblock.

According to a third preferred form of the invention, the impact modifier comprises at least one S-B-M block copolymer and at least one core-shell polymer (A). The proportion of core-shell with respect to the S-B-M can be between 5 for 1 and 1 for 4 and preferably between 3 for 1 and 1 for 2.

According to a fourth preferred form of the invention, the impact modifier comprises at least one S-B-M block copolymer and at least one ATBN or CTBN reactive rubber. The proportion of reactive rubber with respect to the S-B-M can be between 5 for 1 and 1 for 4, preferably between 3 for 1 and 1 for 2.

According to an advantageous form, a portion of the S-B-M can be replaced with an S-B diblock. This portion can be up to 70% by weight of the S-B-M.

It will not be departing from the scope of the invention to replace all or part of the S-B-M triblock with an M-S-B-S-M or M-B-S-B-M pentablock. They can be prepared by anionic polymerization, like the di- or triblocks mentioned above, but by using a difunctional initiator. The number-average molar mass of these pentablocks is within the same ranges as that of the S-B-M triblocks. The proportion of the two M blocks together or of the two B or S blocks together is within the same ranges as the proportions of S, B and M in the S-B-M triblock.

The impact modifier consisting essentially of a block copolymer having at least one block predominantly composed of methyl methacrylate, in particular the S-B-M-triblock or M-B-M-triblock impact modifier (c) is advantageously employed in the compositions according to the invention in amounts of 0.5 to 20% by weight, preferably 1 to 15% by weight and in particular 1.5 to 10% by weight, based on the amount of components (a), (b) and (c).

FURTHER EMBODIMENTS

The compositions according to the invention preferably contain, per 100 parts by weight of the composition, components (a) and (b) in amounts of 70-99.5 parts by weight and component (c) in amounts of 0.5-30 parts by weight and more preferably components (a) and (b) in amounts of 80-99.5 parts by weight and component (c) in amounts of 0.5-20 parts by weight.

Preferably, the content of impact modifier component, especially the block copolymer component, should be limited in order to ensure proper dissolution into the epoxy resin and also for cost reasons.

The compositions of the invention can be prepared by blending the epoxy resin, not yet crosslinked, and the impact modifier using a conventional blending device followed by adding the polyoxyalkyleneamine type hardener. Alternatively, the impact modifier may be blended first with the polyoxyalkyleneamine type hardener and then with the epoxy resin.

The epoxy resin compositions can be prepared using a conventional stirred reactor. The epoxy resin is introduced into the reactor and brought for a few minutes to a temperature sufficient to be fluid (140° C.). The impact modifier comprising the block copolymers is subsequently added and stirred at a temperature sufficient to be fluid until it has completely dissolved. The stirring time depends on the nature of the copolymer added. After three to five hours the blockcopolymers is dissolved at an internal temperature of 140° C.-150°

C. The hardener is then added and blending is carried out for a further 5 minutes at a temperature sufficient to be fluid in order to obtain a homogeneous blend. These blends are subsequently cast and cured in a mould.

The compositions according to the invention can also contain other known additives usually employed in the art of polymerizable materials. Examples of such additives are fillers, pigments, dyes, flame retardant substances, antistatics, adhesion promoters, flow control agents, antioxidants, light stabilizers and fibers.

The compositions according to the invention can be employed quite generally for the production of cured products and can be used in the formulation suitable for the particular specific field of use, for example as coating compositions, paints, pressing compositions, dipping resins, casting resins, impregnating resins, laminating resins, 1- or 2-component adhesives or matrix resins. Use in the field of aerospace, wind mill and sports equipment as laminating resins, hotmelt, composition for the RTM process, 1- or 2-component adhesives or matrix resins is particularly preferred.

EXAMPLES

Unless stated otherwise, "%" is "% by weight" and "part" is "part by weight".

The blends shown in the following Tables are prepared as follows:

100 parts by weight of the epoxy resin is heated to 80° C. The hardeners mentioned in the Table are added at room temperature under stirring and in the course of 15 minutes thoroughly blended. 0.2% BYK A 525 (solution of a copolymer of a methylalkyl polysiloxane modified polyester; degassing agent of BYK-Chemie, Germany) is added and the blend is degassed under vacuum.

At room temperature the pourable blends are casted in at 80° C. pre-heated moulds. It has to be mentioned that the SBM materials can easily be blended in the polyoxyalkyleneamines (Jeffamines®) under the same conditions. The compositions are cured as plates, having a thickness of 4 mm according to the curing schedules given in the tables.

Measurement methods used in the examples:
Measurement of the Impact Strengthening—Measurement of K1C and G1c according to ISO 13586

The critical stress intensity coefficient K1c is measured at room temperature (rt; 23° C.) on notched three-point bending samples according to the procedure provided by Williams and Cawood (Polymer Testing, 9 (1990), 15-26). The test specimens are prenotched with a diamond saw. A finer crack is produced on the samples, clamped in a vice, using a razor blade, the razor blade being given a gentle tap which leads to cracking. This makes it possible to obtain a very fine crack root, similar to a natural crack. The total depth of the notch is measured using a binocular magnifier.

The higher the K1c value of a material is, the better is its resistance to crack initiation.

The resistance to crack propagation can best be characterised by the fracture toughness G1c.

Viscosity:

The viscosity is determined using an Epprecht Instruments EIC Visco Plot (cone C) or a Brookfield CAP 2000 Viscositmeter (cone/Plate).

Example 1

FER1=formulated resin without impact modifier, available commercially as XD4734 from Huntsman Advanced Materials. It is a formulated epoxy resin based on Bisphenol A-epoxy compound.

FER2=resin formed from 95.1 parts by weight of formulated resin similar to XD4734 and 4.9 parts of SBM AFX E 20.

Hardener FJA1=formulated hardener available from Huntsman as XD-4741-S hardener, which contains 50.3% T-403 Jeffamine and 9.1% cycloaliphatic amine.

TABLE 1

|  |  | Reference |
|---|---|---|
| FER1 | — | 100 |
| FER2 | 100 | — |
| FJA1 | 33 | 33 |
| Properties of cured, neat resin (4 mm) Cure: 4 h/70° C. | | |
| Flexural test (ISO 178) | | |
| Flexural modulus (MPa) | 3544 ± 174 | 3673 ± 83 |
| Flexural strength (MPa) | 117 ± 11 | 136 ± 8 |
| Elongation at flexural strength (%) | 4.0 ± 0.7 | 4.7 ± 0.8 |
| Ultimate strength (MPa) | 117 ± 11 | 136 ± 8 |
| Ultimate elongation (%) | 4.0 ± 0.7 | 4.8 ± 0.8 |
| Bend Notch test (ISO 13586) | | |
| Fracture toughness $K_{1C}$ (MPa · m) | 2.28 ± 0.14 | 1.08 ± 0.03 |
| Fracture energy $G_{1C}$ (J/m$^2$) | 1239 ± 153 | 269 ± 17 |

The composition according to example 1, containing epoxy resin, SBM copolymer and Jeffamine hardener provides cured resin products with similar Tg but much better toughness properties than same composition containing no SBM.

The composition according to example 1 has very good adhesion properties and can be used to form structural adhesive to bond stiffners of wind blades.

Examples 2 to 20

Compositions for Composite Products

The following components are used:
Epoxy:
ER1: liquid bisphenol A epoxy resin having a number average molecular weight <700 g/mol
ER2: formulated epoxy resin: contains liquid bisphenol A epoxy resin having a number average molecular weight <700 g/mol and 5% by weight of the epoxy resin of core shell impact modifier. This resin is made according to EP 0 449 776, the content of which is incorporated herein by reference.
Hardeners:
The table below shows a summary of characteristics/properties for the hardeners tested.

TABLE 2

| Hardener | AHEW | Amine Function. | Mw | Chemical Type |
|---|---|---|---|---|
| Polyoxyalkylene amine (Jeffamine ® hardener) | | | | |
| D-230 | 60 | Primary 2 | 230 | Polyoxypropylenediamine |

TABLE 2-continued

| Hardener | AHEW | Amine | Function. | Mw | Chemical Type |
|---|---|---|---|---|---|
| T-403 | 81 | Primary | 3 | 440 | Polyoxypropylenetriamine |
| HK-511 | 59.5 | Primary | 2 | 225 | 1,2-Propylene oxide/ethylene oxide diamine |
| XTJ-568 | 57.6 | Primary | 2 | 204 | Butylene oxide/ethylene oxide diamine |
| XTJ-590 | 43.7 | Primary | 2 | 176 | 1,3-Propylamine oxide/ethylene oxide diamine |
| Cycloaliphatic Amines | | | | | |
| DCH-99 | 28.5 | Primary | 2 | 114 | diaminocyclohexane |
| PACM | 52.5 | Primary | 2 | 210 | bis-(p-aminocyclohexyl) methane |
| Laromin C260 | 60 | Primary | 2 | 238 | 3,3'-dimethyl-4,4'-diaminodicyclohexylmethane |
| Isophorone-diamine IPDA | 42 | Primary | 2 | 170 | 5-amino-1,3,3-trimethylcyclohexanemethaneamine |

AHEW = amine hydrogen equivalent weight
Formula of D-230 is as follows: $H_2N[CH(CH_3)CH_2O]nCH_2CH(CH_3)NH_2$ with n = 2 to 3, generally 2.6, with a mean molecular weight of 230.
Block copolymer impact modifiers:
SBM1: it is an S-B-M triblock copolymer, commercially available as Nanostrength ® SBM AFX E 20 (Arkema, France), in which S is polystyrene, B is polybutadiene and M is PMMA, having a solution viscosity (mPas in 10% toluene) of 7.5.
MAM1: it is an M-A-M triblock copolymer, commercially available as MBM AFX M 22 (Arkema, France), in which B is polybutylacrylate and M is PMMA, having a solution viscosity (mPas in 10% toluene) of 8.4.

Results

TABLE 3

Comparative examples without impact modifier

| | C1 Jeffamine D-230 | C2 Jeffamine T-403 | C3 Jeffamine HK-511 | C4 Jeffamine XTJ-568 | C5 Jeffamine XTJ-590 | C6 Dytec DCH-99 | C7 Amicure PACM | C8 Laromin C260 | C9 IPDA |
|---|---|---|---|---|---|---|---|---|---|
| 100 Parts ER1 | 33 parts | 45 parts | 33 parts | 32 parts | 24 parts | 16 parts | 29 parts | 33 parts | 23 parts |
| Cure Cycle | 4 h/60° C., then 6 h/80° C. | | | | | 1 h/80° C., then 8 h/140° C. | | | |
| Viscosity: Fresh mix, REL 25° C. | | | | | | | | | |
| | 405 mPa·s | 1120 mPa·s | 395 mPa·s | 325 mPa·s | 370 mPa·s | 890 mPa·s | 1720 mPa·s | 2060 mPa·s | 1170 mPa·s |
| Flexural Properties (ISO 178) | | | | | | | | | |
| Modulus (MPa) | 3082 ± 103 | 3042 ± 41 | 3034 ± 28 | 2971 ± 44 | 2595 ± 26 | 3027 ± 24 | 2546 ± 16 | 2716 ± 6 | 2892 ± 30 |
| Max Strength (MPa) | 125 ± 0.7 | 119 ± 1 | 119 ± 1.2 | 126 ± 0.9 | 107 ± 0.1 | 146 ± 12 | 119 ± 9 | 136 ± 0.1 | 143 ± 1.2 |
| Elongation at break (%) | 8.9 ± 0.7 | 10.3 ± 0.8 | 8.8 ± 0.9 | 8.8 ± 0.8 | 9.9 ± 0.5 | 6.8 ± 1.7 | 7.9 ± 2.2 | 8.5 ± 0.3 | 8.5 ± 2.1 |
| Bend Notch Strength (ISO 13586) | | | | | | | | | |
| K1c (MPa·m$^{-1}$) | 0.85 ± 0.05 | 0.95 ± 0.04 | 1.10 ± 0.04 | 0.78 ± 0.05 | 1.93 ± 0.04 | 0.61 ± 0.03 | 0.83 ± 0.06 | 0.69 ± 0.04 | 0.71 ± 1.0 |
| G1c (Jm$^{-2}$) | 196 ± 21 | 250 ± 20 | 334 ± 26 | 175 ± 25 | 1206 ± 55 | 103 ± 11 | 228 ± 31 | 147 ± 18 | 147 ± 41 |

TABLE 4

Compositions with SBM1 (5%)

| | 2 Jeffamine D-230 | 3 Jeffamine T-403 | 4 Jeffamine HK-511 | 5 Jeffamine XTJ-568 | 6 Jeffamine XTJ-590 | C10 Dytec DCH-99 | C11 Amicure PACM | C12 Laromin C260 | C13 IPDA |
|---|---|---|---|---|---|---|---|---|---|
| 100 Parts ER1 (5% SBM AFX E20) | 31 parts | 42 parts | 31 parts | 30 parts | 23 parts | 15 parts | 27 parts | 31 parts | 22 parts |
| Cure Cycle | 4 h/60° C., then 6 h/80° C. | | | | | 1 h/80° C., then 8 h/140° C. | | | |
| Viscosity: Fresh mix, REL 25° C. | | | | | | | | | |
| | 2080 mPa·s | 780 mPa·s | 820 mPa·s | 630 mPa·s | 2800 mPa·s | 6560 mPa·s | 4480 mPa·s | 3200 mPa·s | |
| Flexural Properties (ISO 178) | | | | | | | | | |

TABLE 4-continued

Compositions with SBM1 (5%)

Example

| | 2<br>Jeffamine<br>D-230 | 3<br>Jeffamine<br>T-403 | 4<br>Jeffamine<br>HK-511 | 5<br>Jeffamine<br>XTJ-568 | 6<br>Jeffamine<br>XTJ-590 | C10<br>Dytec<br>DCH-99 | C11<br>Amicure<br>PACM | C12<br>Laromin<br>C260 | C13<br>IPDA |
|---|---|---|---|---|---|---|---|---|---|
| Modulus (MPa) | 2979 ± 32 | 2932 ± 25 | 2945 ± 114 | 2804 ± 13 | 2281 ± 16 | 2880 ± 22 | 2484 ± 46 | 2615 ± 35 | 2684 ± 24 |
| Max Strength (MPa) | 114 ± 0.1 | 110 ± 0.1 | 108 ± 2.2 | 112 ± 0.5 | 95 ± 1 | 134 ± 8 | 113 ± 3 | 129 ± 1.8 | 127 ± 1 |
| Elongation at break (%) | 11.2 ± 1.3 | 10.5 ± 0.7 | 12.4 ± 1.0 | 9.9 ± 1.1 | 12.5 ± 1.0 | 6.8 ± 1.5 | 8.2 ± 1.6 | 7.2 ± 0.3 | 7.8 ± 0.9 |
| Bend Notch Strength (ISO 13586) | | | | | | | | | |
| $K_{1c}$ (MPa·m$^{-1}$) | 2.75 ± 0.1 | 2.34 ± 0.04 | 2.87 ± 0.09 | 2.60 ± 0.2 | 2.14 ± 0.14 | 1.16 ± 0.04 | 1.09 ± 0.03 | 0.95 ± 0.03 | 1.18 ± 0.03 |
| $G_{1c}$ (Jm$^{-2}$) | 2131 ± 153 | 1571 ± 56 | 2353 ± 145 | 2035 ± 326 | 1698 ± 229 | 391 ± 24 | 399 ± 24 | 292 ± 19 | 434 ± 25 |

TABLE 5

Compositions with block copolymer MAM1 (5%)

| | 7<br>Jeffamine<br>D-230 | 8<br>Jeffamine<br>T-403 | 9<br>Jeffamine<br>HK-511 | 10<br>Jeffamine<br>XTJ-568 | 11<br>Jeffamine<br>XTJ-590 | C14<br>Dytec<br>DCH-99 | C15<br>Amicure<br>PACM | C16<br>Laromin<br>C260 | C17<br>IPDA |
|---|---|---|---|---|---|---|---|---|---|
| 100 Parts ER1 (5% SBM M-22) | 31 parts | 42 parts | 31 parts | 30 parts | 23 parts | 15 parts | 27 parts | 31 parts | 22 parts |
| Cure Cycle | 4 h/60° C., then 6 h/80° C. | | | | | 1 h/80° C., then 8 h/140° C. | | | |
| Viscosity: Fresh mix, REL 25° C. | | | | | | | | | |
| | 3160 mPa·s | 1150 mPa·s | 1170 mPa·s | 1050 mPa·s | 3920 mPa·s | 6320 mPa·s | 7360 mPa·s | | 4520 mPa·s |
| Flexural Properties (ISO 178) | | | | | | | | | |
| Modulus (MPa) | 3024 ± 66 | 2915 ± 31 | 2863 ± 82 | 2734 ± 39 | 2333 ± 29 | 2834 ± 33 | 2537 ± 53 | 2644 ± 44 | 2696 ± 32 |
| Max Strength (MPa) | 118 ± 1 | 113 ± 0.8 | 109 ± 1 | 114 ± 0.3 | 96 ± 0.5 | 138 ± 2 | 119 ± 1 | 123 ± 9 | 130 ± 3 |
| Elongation at break (%) | 10.8 ± 1.7 | 8.4 ± 1.7 | 12.7 ± 0.1 | 9.0 ± 0.6 | 8.3 ± 0.0 | 7.0 ± 0.5 | 7.9 ± 1.0 | 6.1 ± 0.9 | 7.1 ± 0.6 |
| Bend Notch Strength (ISO 13586) | | | | | | | | | |
| $K_{1c}$ (MPa·m$^{-1}$) | 2.31 ± 0.1 | 2.02 ± 0.03 | 1.91 ± 0.1 | 1.85 ± 0.2 | 2.24 ± 0.05 | 0.95 ± 0.03 | 0.96 ± 0.02 | 0.84 ± 0.02 | 1.01 ± 0.03 |
| $G_{1c}$ (Jm$^{-2}$) | 1481 ± 146 | 1173 ± 29 | 1071 ± 106 | 1066 ± 251 | 1806 ± 86 | 269 ± 18 | 304 ± 13 | 226 ± 10 | 320 ± 16 |

TABLE 6

Compositions with core shell without block copolymer

| | 12<br>Jeffamine<br>D-230 | 13<br>Jeffamine<br>T-403 | 14<br>Jeffamine<br>HK-511 | 15<br>Jeffamine<br>XTJ-568 | 16<br>Jeffamine<br>XTJ-590 | 17<br>Dytec<br>DCH-99 | 18<br>Amicure<br>PACM | 19<br>Laromin<br>C260 | 20<br>IPDA |
|---|---|---|---|---|---|---|---|---|---|
| 100 Parts ER2 (5% Core Shell) | 30 parts | 41 parts | 30 parts | 29 parts | 22 parts | 14 parts | 26 parts | 30 parts | 21 parts |
| Cure Cycle | 4 h/60° C., then 6 h/80° C. | | | | | 1 h/80° C., then 8 h/140° C. | | | |
| Viscosity: Fresh mix, REL 25° C. | | | | | | | | | |
| | 700 mPa·s | 1760 mPa·s | 565 mPa·s | 560 mPa·s | 580 mPa·s | 1800 mPa·s | 3080 mPa·s | 3480 mPa·s | 2100 mPa·s |
| Flexural Properties (ISO 178) | | | | | | | | | |
| Modulus (MPa) | 3048 ± 45 | 2962 ± 31 | 2910 ± 25 | 2826 ± 44 | 2533 ± 39 | 2980 ± 37 | 2570 ± 64 | 2624 ± 16 | 2856 ± 41 |
| Max Strength | 115 ± 1 | 111 ± 1 | 109 ± 1 | 116 ± 1 | 102 ± 1 | 142 ± 2 | 117 ± 4 | 126 ± 4 | 133 ± 2 |

TABLE 6-continued

Compositions with core shell without block copolymer

| | 12 Jeffamine D-230 | 13 Jeffamine T-403 | 14 Jeffamine HK-511 | 15 Jeffamine XTJ-568 | 16 Jeffamine XTJ-590 | 17 Dytec DCH-99 | 18 Amicure PACM | 19 Laromin C260 | 20 IPDA |
|---|---|---|---|---|---|---|---|---|---|
| (MPa) Elongation at break (%) | 9.2 ± 1.0 | 9.6 ± 0.7 | 10.2 ± 1.4 | 10.6 ± 0.8 | 11.1 ± 0.7 | 7.4 ± 0.8 | 7.4 ± 1.4 | 7.4 ± 1.3 | 7.9 ± 1.0 |
| Bend Notch Strength (ISO 13586) | | | | | | | | | |
| K1c (MPa · m$^{-1}$) | 2.61 ± 0.03 | 2.23 ± 0.05 | 2.69 ± 0.10 | 2.26 ± 0.06 | 2.1 ± 0.06 | 0.93 ± 0.04 | 1.06 ± 0.03 | 0.91 ± 0.02 | 1.03 ± 0.09 |
| G1c (Jm$^{-2}$) | 1877 ± 49 | 1414 ± 60 | 2098 ± 156 | 1519 ± 82 | 1463 ± 77 | 245 ± 24 | 365 ± 19 | 264 ± 12 | 311 ± 55 |

Discussion of the results;
1. Regarding the flexural modulus, flexural strength and flexural elongation;

The results are very similar for these properties amongst all examples and comparatives.

2. Tg

In none of the investigated cases the Tg has been lowered by addition of impact modifier by more than 10%. Typically the Tg decrease is in the range of 0-3% when adding 5% of SBM or MAM, and can be 5-10% when adding core/shell toughener.

3. Toughener

The core shell particles must be dispersed in the epoxy resin while copolymers like MAM, SBM etc are dissolved in the starting epoxy resin. This permits an homogenous distribution of the copolymer while, particles can agglomerate after some time, leading to an heterogen distribution in the resin matrix which may produce product exhibiting heterogen properties. It is possible to achieve better K1C and G1C values with copolymers, especially of the SBM type. Epoxy resin compositions containing core shells particles can only lead to opaque products while copolymers-containing composition may lead to translucent or transparent products. Therefore compositions containing copolymers are preferred. Preferably, the epoxy resin composition comprises:

(a) an epoxy resin liquid at room temperature having on average more than one 1,2-epoxide group in the molecule;

(b) a hardener-accelerator system consisting essentially of a polyoxyalkyleneamine type hardener;

(c) an impact modifier containing at least one of: a block copolymer having at least one block predominantly composed of methyl methacrylate.

The improvement in G1C-toughness when adding 5% of the claimed impact modifiers is typically in the range of 500-1200% for compositions containing Jeffamine® hardeners. The toughness increase is the highest when the composition contains a polyoxyalkylene amine and SBM block copolymer.

4. Toughness: K1c and GC

TABLE 7

| JA: | ER1 | ER2 (with core shell) | ER1 + 5% SBM1 | ER1 + 5% MAM1 |
|---|---|---|---|---|
| Bend Notch strength K1C | | | | |
| D-230 | 0.85 | 2.61 | 2.75 | 2.31 |
| T-403 | 0.95 | 2.23 | 2.34 | 2.02 |
| HK-511 | 1.1 | 2.69 | 2.87 | 1.91 |
| XTJ-568 | 0.78 | 2.26 | 2.6 | 1.85 |
| XTJ-590 | 1.93 | 2.1 | 2.14 | 2.24 |
| Acomparison: | | | | |
| DCH-99 | 0.61 | 0.93 | 1.16 | 0.95 |
| PACM | 0.83 | 1.06 | 1.09 | 0.96 |
| Laromin C260 | 0.69 | 0.91 | 0.95 | 0.84 |
| IPDA | 0.71 | 1.03 | 1.18 | 1.01 |
| Bend Notch strength G1c | | | | |
| D-230 | 196 | 1877 | 2131 | 1481 |
| T-403 | 250 | 1414 | 1571 | 1173 |
| HK-511 | 334 | 2098 | 2353 | 1071 |
| XTJ-568 | 175 | 1519 | 2035 | 1066 |
| XTJ-590 | 1206 | 1463 | 1698 | 1806 |
| Acomparison: | | | | |
| DCH-99 | 103 | 245 | 391 | 269 |
| PACM | 228 | 365 | 399 | 304 |
| Laromin C260 | 147 | 264 | 292 | 226 |
| IPDA | 147 | 311 | 434 | 320 |

Toughness of the cured resin is increased when an impact modifier (toughening agent) is present in the composition.

For each amine, save XTJ 590, this toughness increase is the highest with the block copolymer SBM1, then with core shell then with MAM1.

The behavior of compositions containing polyoxyalkylene amine XTJ-590 is different than the others as XTJ 590 provides a high toughness even without any toughening agent present in the composition. This hardener reacts very fast with epoxy resins which is limiting the work life. This is restricting the use for a number of applications where a longer open time is required.

When comparing the influence of 5% of impact modifier to standard amine/epoxy systems the improvement in G1C-toughness is in the range of 200-400%.

However, the toughness increase of cured resins made from epoxy resin compositions containing impact modifiers is dramatically increased for compositions containing Jeffamine® hardeners, which was not expected.

Further Examples

The following products are used:
ER1: liquid bisphenol A epoxy resin having a number average molecular weight <700 g/mol
ERcomparison: epoxy resin: it is a bisphenol A diglycidyl ether (BADGE) with a molar mass of 383 g/mol, with a mean number of hydroxyl groups per one epoxy group of n=0.075, sold by the company Huntsman Company under the commercial reference LY556.

JA1: polyoxypropylene-diamine having an average molecular weight of approximately 230

JA2: hardener composition based on 72% of polyoxypropylene-diamine having an average molecular weight of approximately 230, 19% of isophorondiamin and 9% of 2,2-dim ethyl-4,4-methylenebis(cyclohexylamine)

A3: hardener composition based on 26% of dicyandiamide, 13% of chlortolurone and 61% of a bisphenol A resin with 5.1-5.8 val epoxide/kg)

Acomparison: 4,4'-methylenebis-(3-chloro-2,6-diethylaniline), sold by the company Lonza under the commercial reference LONZACURE M-CDEA SBM1: it is an S-B-M triblock copolymer, commercially available as SBM AFX E 40 (Arkema, France), in which S is polystyrene, B is polybutadiene and M is PMMA, having a solution viscosity (mPas in 10% toluene) of 4.1.

SBM2: it is an S-B-M triblock copolymer, commercially available as SBM AFX E 20 (Arkema, France), in which S is polystyrene, B is polybutadiene and M is PMMA, having a solution viscosity (mPas in 10% toluene) of 7.5.

MAM1: it is an M-A-M triblock copolymer, commercially available as MBM AFX M 22 (Arkema, France), in which A is polybutylacrylate and M is PMMA, having a solution viscosity (mPas in 10% toluene) of 8.4.

SBM1comparison: it is an S-B-M triblock copolymer, in which S is polystyrene, B is polybutadiene and M is PMMA, comprising 22% as fraction by mass of polystyrene, 9% as fraction by mass of polybutadiene and 69% by mass of poly (methyl methacrylate), obtained by anionic polymerization successively of a polystyrene block with a number-average molar mass of 27,000 g/mol, of a polybutadiene block with a mass of 11,000 g/mol and of a poly(methyl methacrylate) block with a number-average molar mass of 84,000 g/mol. This product exhibits three glass transitions, one of −90° C., another of 95° C. and a third of 130° C.

SBM2comparison: it is an S-B-M triblock copolymer, in which S is polystyrene, B is polybutadiene and M is PMMA, comprising 12% as fraction by mass of polystyrene, 18% as fraction by mass of polybutadiene and 70% by mass of poly (methyl methacrylate), obtained by anionic polymerization successively of a polystyrene block with a number-average molar mass of 14,000 g/mol, of a polybutadiene block with a mass of 22,000 g/mol and of a poly(methyl methacrylate) block with a number-average molar mass of 85,000 g/mol. This product exhibits three glass transitions, one of −90° C., another of 95° C. and a third of 130° C.

Preparation of the Compositions (Preparation of a 10%-Solution)

Blending of the SBM into the Epoxy Resin.

In a reactor equipped with reflux condenser and stirrer is placed 450 g of ER1. Under stirring 50 g of SBM2 is added during 10 minutes. That mixture is heated to an internal temperature of 140° C. to 150° C. At that temperature slow dissolution of the SBM2 is observed. The SBM2 is completely dissolved within three to five hours at an internal temperature of 140° C. to 150° C.

The slightly turbid solution is discharged at 130° C. to 140° C.

The solution is then cooled to room temperature.

In the analogous way the preparation of a 5% solution and solutions of SBM1 is carried out. The Brookfield viscosities of the blends are given in Table 7.

TABLE 7

| Relative Viscosity | ER1/SBM2 90/10 | ER1/SBM2 95/5 |
|---|---|---|
| At 25° C. | 44160 mPas | 15680 mPas |
| At 40° C. | 8320 mPas | 2120 mPas |

Blending of SBM into a Jeffamine Hardener 375 g of JA1 are placed in a reactor equipped with reflux condenser, thermometer and stirrer.

At room temperature 125 g of SBM2 is added. The milky white solution is heated. After 35 minutes at an internal temperature if 107° C. results a translucent solution. That solution is stirred for further two to three hours at 110° C. to 120° C.

The blend is discharged at 110° C.

The blends shown in the following Tables are prepared as follows:

100 parts by weight of the epoxy resin is heated to 80° C. The hardeners mentioned in the Table are added at room temperature under stirring and in the course of 15 minutes thoroughly blended. 0.2% BYK A 525 (solution of a copolymer of a methylalkyl polysiloxane modified polyester; degassing agent of BYK-Chemie, Germany) is added and the blend is degassed under vacuum.

At room temperature the pourable blends are casted in at 80° C. pre-heated moulds. It has to be mentioned that the SBM materials can easily be blended in the polyoxyalkyleneamines (Jeffamines®) under the same conditions. The compositions are cured as plates, having a thickness of 4 mm according to the curing schedules given in the tables, cf. example C.

TABLE 8

|  | Examples 4-5 of EP1290088 | A | B | C |
|---|---|---|---|---|
| SBM2 (5% in ER1) [parts] |  | 100 |  |  |
| SBM2 (10% in ER1) [parts] |  |  | 100 |  |
| ER1 [parts] |  |  |  | 100 |
| JA1 [parts] |  | 30 | 30 |  |
| SBM2 (14% in JA1) [parts] |  |  |  | 39 |
| ERcomparison [parts] | 72 |  |  |  |
| Acomparison [parts] | 36 |  |  |  |
| SBM1- or SBM2comparison [parts] | 12 |  |  |  |
| Viscosity at 25° C. [mPas]* |  | 840 | 1480 | 1020 |
| Crit. stress int. coeff. K1c [MPa√m] | 0.77-0.88 | 3.44 ± 0.4 | 3.1 ± 0.4 | 3.0 |
| Fracture toughness G1c [J/m$^2$] |  | 3527 ± 770 | 2600 + 626 | 2474 |
| Cure schedule |  | 4 h/60° C. + 6 h 80° C. | | |

TABLE 9

|  | D | E |
|---|---|---|
| SBM1 (5% in ER1) | 100 | |
| SBM1 (10% in ER1) | | 100 |
| JA1 | 30 | 30 |
| Viscosity at 25° C. [mPas]* | 920 | 1880 |
| Crit. stress int. coeff. K1c [Mpa√m] | 2.9 ± 0.03 | 3.1 ± 0.05 |
| Fracture toughness G1c [J/m$^2$] | 2209 ± 43 | 2647 + 78 |
| Cure schedule | 4 h/60° C. + 6 h/80° C. | |

TABLE 10

|  | F | G |
|---|---|---|
| MAM1 (5% in ER1) | 100 | |
| MAM1 (10% in ER1) | | 100 |
| JA1 | 30 | 30 |
| Viscosity at 25° C. [mPas]* | 1600 | 3680 |
| Crit. stress int. coeff. K1c [MPa√m] | 2.2 ± 0.1 | 2.2 ± 0.1 |
| Fracture toughness G1c [J/m$^2$] | 1256 ± 70 | 1511 + 83 |
| Cure schedule | 4 h/60° C. + 6 h/80° C. | |

TABLE 11

|  | H | I |
|---|---|---|
| SBM2 (5% in ER1) | 100 | |
| SBM2 (10% in ER1) | | 100 |
| JA2 | 30 | 30 |
| Viscosity at 25° C. [mPas]* | 520 | 1000 |
| Crit. stress int. coeff. K1c [MPa√m] | 2.8 ± 0.1 | 2.6 ± 0.1 |
| Fracture toughness G1c [J/m$^2$] | 2285 ± 140 | 2294 + 117 |
| Cure schedule | 5 h/100° C. | |

TABLE 12

|  | J | K |
|---|---|---|
| SBM2 (5% in ER1) | 100 | |
| SBM2 (10% in ER1) | | 100 |
| A3 | 22 | 22 |
| JA1 | 12 | 12 |
| Viscosity at 25° C. [mPas]* | 8000 | 14720 |
| Crit. stress int. coeff. K1c [MPa√m] | 1.5 ± 0.1 | 2.0 ± 0.0 |
| Fracture toughness G1c [J/m$^2$] | 587 ± 54 | 1048 + 43° |
| Cure schedule | 24 h/rt + 10 H/90° C. | |

*Epprecht Instruments EIC Visco Plot (cone C)

The invention claimed is:

1. Epoxy resin composition consisting of:
   (a) 30 to 94.5% by weight, based on the amount of components (a), (b) and (c) of an epoxy resin liquid at room temperature having on average more than one 1,2-epoxide group in the molecule;
   (b) a hardener-accelerator system consisting of a polyoxyalkylenediamine type hardener or a combination of a polyoxyalkylenediamine type hardener and a non-polyoxyalkyleneamine type hardener selected from a cycloaliphatic amine and an aromatic amine;
   (c) an impact modifier consisting of an S-B-M block copolymer, an M-B-M block copolymer, a combination of an S-B-M block copolymer and at least one second polymer, or a combination of an M-B-M block copolymer and at least one second polymer, wherein the at least one second polymer is selected from the group consisting of an S-B block copolymer, an amine terminated butadiene acrylonitrile copolymer, a carboxyl terminated butadiene acrylonitrile, and combinations thereof; and
   (d) optional additives selected from the group consisting of a degassing agent, fillers, pigments, dyes, flame retardant substances, antistatics, adhesion promoters, flow control agents, antioxidants, light stabilizers, fibers and combinations thereof.

2. Epoxy resin composition according to claim 1 wherein (a) is an aromatic epoxy resin.

3. Epoxy resin composition according to claim 1 wherein (b) is employed in amounts of 5 to 50% by weight, based on the amount of components (a), (b) and (c).

4. Epoxy resin composition according to claim 1 wherein (c) is employed in amounts of 0.5 to 20% by weight, based on the amount of components (a), (b) and (c).

5. Epoxy resin composition according to claim 1 wherein, per 100 parts by weight of the composition of (a), (b) and (c), components (a) and (b) are present in amounts of 70-99.5 parts by weight and component (c) in amounts of 0.5-30 parts by weight.

6. Epoxy resin composition according to claim 1 wherein an additive is present.

7. A method of preparing an epoxy resin composition according to claim 1 comprising the steps of:
   blending an epoxy resin liquid having on average more than one 1,2-epoxide group in the molecule with an impact modifier consisting of an S-B-M, an M-B-M block copolymer, a combination of an S-B-M block copolymer and at least one second polymer, or a combination of an M-B-M block copolymer and at least one second polymer, wherein the at least one second polymer is selected from the group consisting of an S-B block copolymer, an amine terminated butadiene acrylonitrile copolymer, a carboxyl terminated butadiene acrylonitrile and combinations thereof at a temperature sufficient to fluidize the impact modifier until it has completely dissolved;
   adding a hardener-accelerator system consisting of a polyoxyalkylenediamine type hardener or a combination of a polyoxyalkylenediamine type hardener and a non-polyoxyalkyleneamine type hardener selected from a cycloaliphatic amine and an aromatic amine and optionally adding additives selected from the group consisting of a degassing agent, fillers, pigments, dyes, flame retardant substances, antistatics, adhesion promoters, flow control agents, antioxidants, light stabilizers, fibers and combinations thereof to the resulting blend to obtain a homogeneous blend and to form the epoxy resin composition.

8. A method of preparing and curing an epoxy resin composition according to claim 1 comprising the steps of:
   (a) blending an epoxy resin liquid having on average more than one 1,2-epoxide group in the molecule with an impact modifier consisting of an S-B-M block copolymer, an M-B-M block copolymer, a combination of an S-B-M block copolymer and at least one second polymer, or a combination of an M-B-M block copolymer and at least one second polymer, wherein the at least one second polymer is selected from the group consisting of an S-B block copolymer, an amine terminated butadiene acrylonitrile copolymer, a carboxyl terminated butadiene acrylonitrile and combinations thereof at a temperature sufficient to fluidize the impact modifier until it has completely dissolved;
   (b) adding a hardener-accelerator system consisting of a polyoxyalkylenediamine type hardener or a combination of a polyoxyalkylenediamine type hardener and a non-polyoxyalkyleneamine type hardener selected from a cycloaliphatic amine and an aromatic amine and optionally adding additives selected from the group consisting of a degassing agent, fillers, pigments, dyes, flame retardant substances, antistatics, adhesion promoters, flow control agents, antioxidants, light stabilizers, fibers and combinations thereof to the resulting blend to obtain a homogeneous blend and to form the epoxy resin composition;
(c) applying the epoxy resin composition to a substrate or casting the epoxy resin composition in a mould; and
(d) applying heat to the epoxy resin composition to cure the epoxy resin composition.

* * * * *